(12) United States Patent
Kanno

(10) Patent No.: US 6,508,680 B2
(45) Date of Patent: Jan. 21, 2003

(54) ENGINE CONTROL ARRANGEMENT FOR FOUR STROKE WATERCRAFT

(75) Inventor: Isao Kanno, Shizuoka (JP)

(73) Assignee: Sanshin Kogyo Kabushiki Kaisha (JP)

( * ) Notice: Subject to any disclaimer, the term of this patent is extended or adjusted under 35 U.S.C. 154(b) by 0 days.

(21) Appl. No.: 09/919,364

(22) Filed: Jul. 31, 2001

(65) Prior Publication Data

US 2002/0049013 A1 Apr. 25, 2002

(30) Foreign Application Priority Data

Jul. 31, 2000 (JP) .................................. 2000-230968

(51) Int. Cl.$^7$ ............................................. B63H 21/22
(52) U.S. Cl. ............................................. 440/1; 440/87
(58) Field of Search ......................................... 440/1, 87

(56) References Cited

U.S. PATENT DOCUMENTS

| | | | |
|---|---|---|---|
| 4,850,318 A | 7/1989 | Torigai et al. | |
| 4,909,764 A | 3/1990 | Hirukawa et al. | 440/1 |
| 5,715,793 A | 2/1998 | Motose | |
| 5,782,659 A | 7/1998 | Motose | 440/1 |
| 5,937,825 A | 8/1999 | Motose | |
| 5,967,862 A | * 10/1999 | Motose | 440/1 |
| 6,086,435 A | * 7/2000 | Hoshiba et al. | 440/1 |

* cited by examiner

*Primary Examiner*—Jesus D. Sotelo
(74) *Attorney, Agent, or Firm*—Knobbe, Martens, Olson & Bear, LLP

(57) ABSTRACT

A watercraft has an engine that is controlled to reduce the likelihood of engine stall when the watercraft engine speed is rapidly decreased while the watercraft is in a planing mode. The engine is controlled by a method that detects a rapid engine speed decrease when the watercraft is believed to be in the planing mode. A operational characteristic of the engine is adjusted to increase the engine speed such that, after the engine reaches a stable engine speed, the stable engine speed is higher than a desired idle speed. The operational characteristic can be an advance in ignition timing or an increase in airflow to the engine.

20 Claims, 10 Drawing Sheets

ENGINE CONTROL ARRANGEMENT FOR FOUR STROKE WATERCRAFT

PRIORITY INFORMATION

This application is based on and claims priority to Japanese Patent Application No. 2000-230968, filed Jul. 31, 2000, the entire contents of which is hereby expressly incorporated by reference.

BACKGROUND OF THE INVENTION

1. Field of the Invention

The present application generally relates to an engine control arrangement for controlling a four-stroke watercraft, and more particularly relates to an engine management system that prevents engine stalling under rapid deceleration.

2. Description of the Related Art

Watercraft, including personal watercraft and jet boats, are often powered by an internal combustion engine having an output shaft arranged to drive a water propulsion device. Occasionally, rapid deceleration occurs at high watercraft speeds and, because watercraft do not have brakes, water resistance experienced along the sides of the hull are the primary source of deceleration.

Watercraft often operate within three modes of operation: displacement mode, transition mode and planing mode. During lower speeds, the hull displaces water to remain buoyant; this is the displacement mode. At a particular watercraft speed relative to the water, a portion of the hull rises up from the water and the watercraft begins planing across the water; this is the planing mode. Of course, the transition mode occurs between the displacement mode and the planing mode and involves the range of watercraft speeds that cause a transition between the planing and displacement modes.

Importantly, while the watercraft is planing (i.e., up on plane), the wetted surface area of the watercraft is decreased and the water resistance is substantially reduced. On the other hand, once the watercraft slows to a speed that brings the watercraft off plane (i.e., transition mode and/or displacement mode), the wetted surface area of the watercraft is significantly increased and the water resistance dramatically increases. Because the water resistance is higher in non-planing modes, the rate of deceleration of the watercraft is also higher in the non-planing modes than in the planing mode.

To move from the planing mode to either the transition mode or the displacement mode, a throttle valve often is rapidly closed to cause the watercraft to decelerate. In some instances, the throttle valve is allowed to close almost entirely under the biasing force of a return spring that acts against a throttle valve control cable and operation (i.e., finger or thumb paddle). This rapid closure of the throttle valve can induce a rapid deceleration state.

In a rapid deceleration state, the air supplied to the cylinder bores of the engine decreases at a much faster rate than the control system controlling a set of fuel injectors can react. Thus, the amount of fuel being injected into the cylinders is excessive with respect to the amount of air entering the cylinders; a rich air-fuel mixture results. An overly rich mixture tends to cause an engine to stall. In addition, because the speed of the water passing the propulsion device tends to affect engine speed, the move from planing mode can cause the engine speed to decrease even more rapidly once the watercraft moves out of the planing mode and into the displacement mode. Thus, the engine is susceptible to stalling during rapid deceleration.

An additional problem in watercraft is irregularity in engine idle speed caused by variances in the air/fuel ratio. The variances generally are caused by condensation of the fuel within the combustion chamber and/or the induction system. In particular, when the engine is operated below a certain temperature, the fuel in the air/fuel mixture tends to condense on the walls of the intake manifold, the intake port and the cylinder walls. Such condensation increases the air/fuel ratio, which adversely affects engine performance.

SUMMARY OF THE INVENTION

Accordingly, an engine control arrangement has been developed to better control engine speed during rapid deceleration in order to prevent stalling. In addition, the engine control arrangement can be configured to maintain the air/fuel mixture at a desired ratio by adding more fuel at lower temperatures to return the air/fuel ratio to a desired level.

Thus, one aspect of the present invention involves a method of controlling a marine engine associated with a watercraft. The method comprises sensing a rapid deceleration when the watercraft is in a planing mode, altering an engine operating parameter to increase the engine speed when the rapid deceleration occurs when the watercraft is in the planing mode, sensing when an engine speed has attained a stabilized engine speed lower than an engine speed associated with the planing mode and returning the engine operating parameter to normal after then engine speed has attained the stabilized engine speed.

Another aspect of the present invention involves a personal watercraft comprising a hull adapted for at least two modes of operation: a planing mode and a displacement mode. An engine is disposed within the hull. The engine comprises a cylinder defined by a cylinder wall. A piston is reciprocally mounted within the cylinder. A combustion chamber is at least partially defined by the piston. The piston is drivingly connected to a crankshaft. A crankshaft sensor is adapted to sense a speed of the crankshaft. An induction system supplies air to the combustion chamber. A throttle valve is disposed within the induction system. An induction sensor is adapted to sense an airflow into the combustion chamber. An ignition system comprises an igniter that is disposed within the combustion chamber to ignite an air-fuel charge within the combustion chamber. A controller is in electrical communication with the crankshaft sensor and the induction system. The controller is adapted to adjust an engine operating parameter if the watercraft is in the planing mode and if the engine undergoes a rapid decrease in engine speed. The engine operating parameter is adjusted such that a rate of engine speed decrease is slowed.

BRIEF DESCRIPTION OF THE DRAWINGS

These and otter aspects of the present invention are described in detail below with reference to the accoypanying drawings. The drawings comprise 13 figures.

FIG. 9b is a diagram illustrating the amount of fuel being injected into the engine as a percentage when the throttle valve is moved in the manner shown in FIG. 9a.

DETAILED DESCRIPTION OF THE PREFERRED EMBODIMENT

With reference to FIGS. 1 to 6, an overall configuration of a personal watercraft 10 and its engine 12 will be described. The watercraft 10 employs the internal combustion engine 12, which preferably is configured in accordance with a preferred embodiment of the present invention. The described engine configuration and the associated control routine have particular utility for use within the personal watercraft, and thus, are described in the context of personal watercraft. The engine configuration and the control routine, however, also can be applied to other types of watercraft, such as, for example, small jet boats and other vehicles that feature marine drives.

Figure 1:
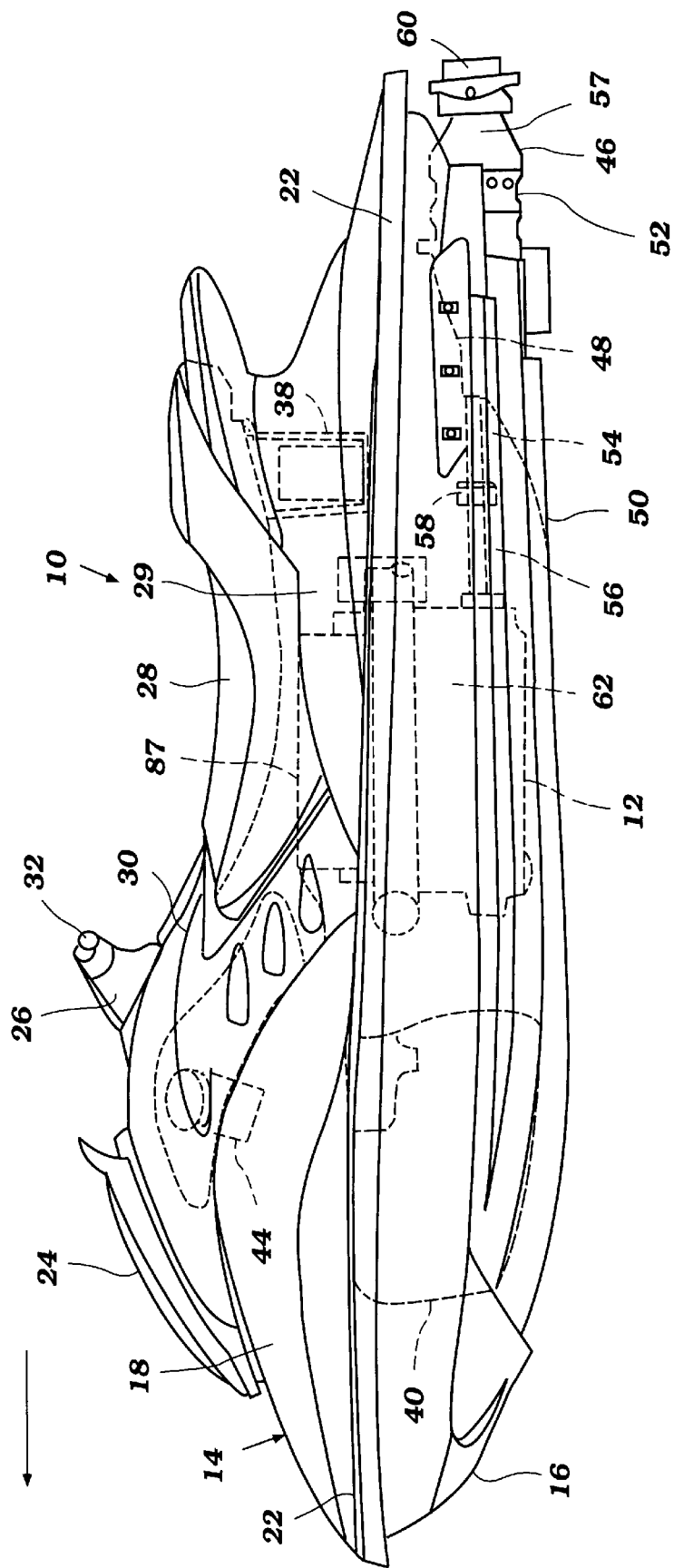
FIG. 1 is a side elevational view of a personal watercraft of the type powered by an engine controlled in accordance with certain features, aspects and advantages of the present invention. Several of the internal components of the watercraft (e.g., the engine) are illustrated in phantom

With reference initially to FIG. 1, the personal watercraft 10 includes a hull 14 formed with a lower hull section 16 and an upper hull section or deck 18. The lower hull section 16 and the upper hull section 18 preferably are coupled together to define an internal cavity 20 (see FIG. 5). A bond flange 22 defines an intersection of both of the hull sections 16, 18.

Figure 2:
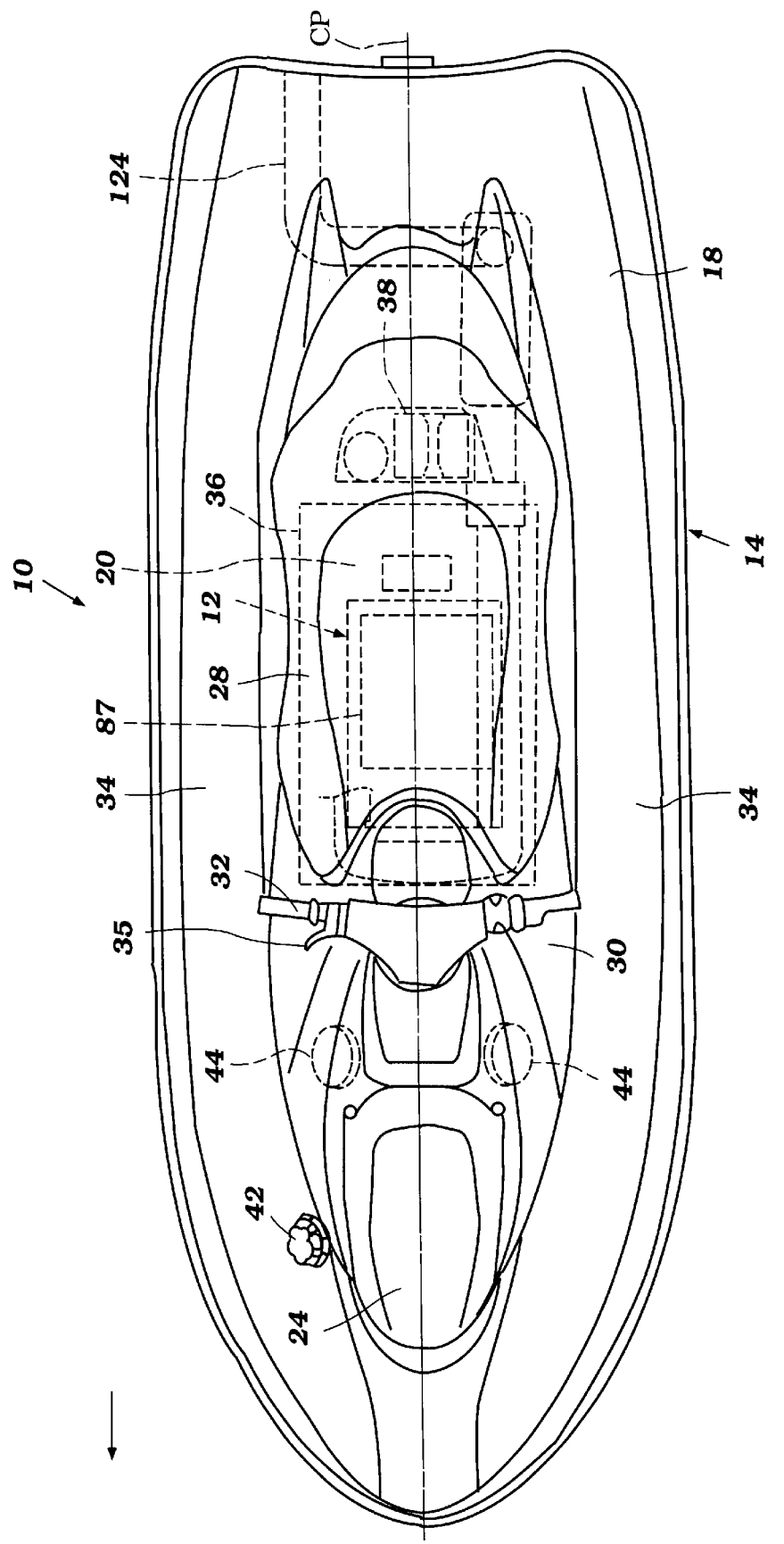
FIG. 2 is a top plan view of the watercraft of FIG. 1.
Figure 5:
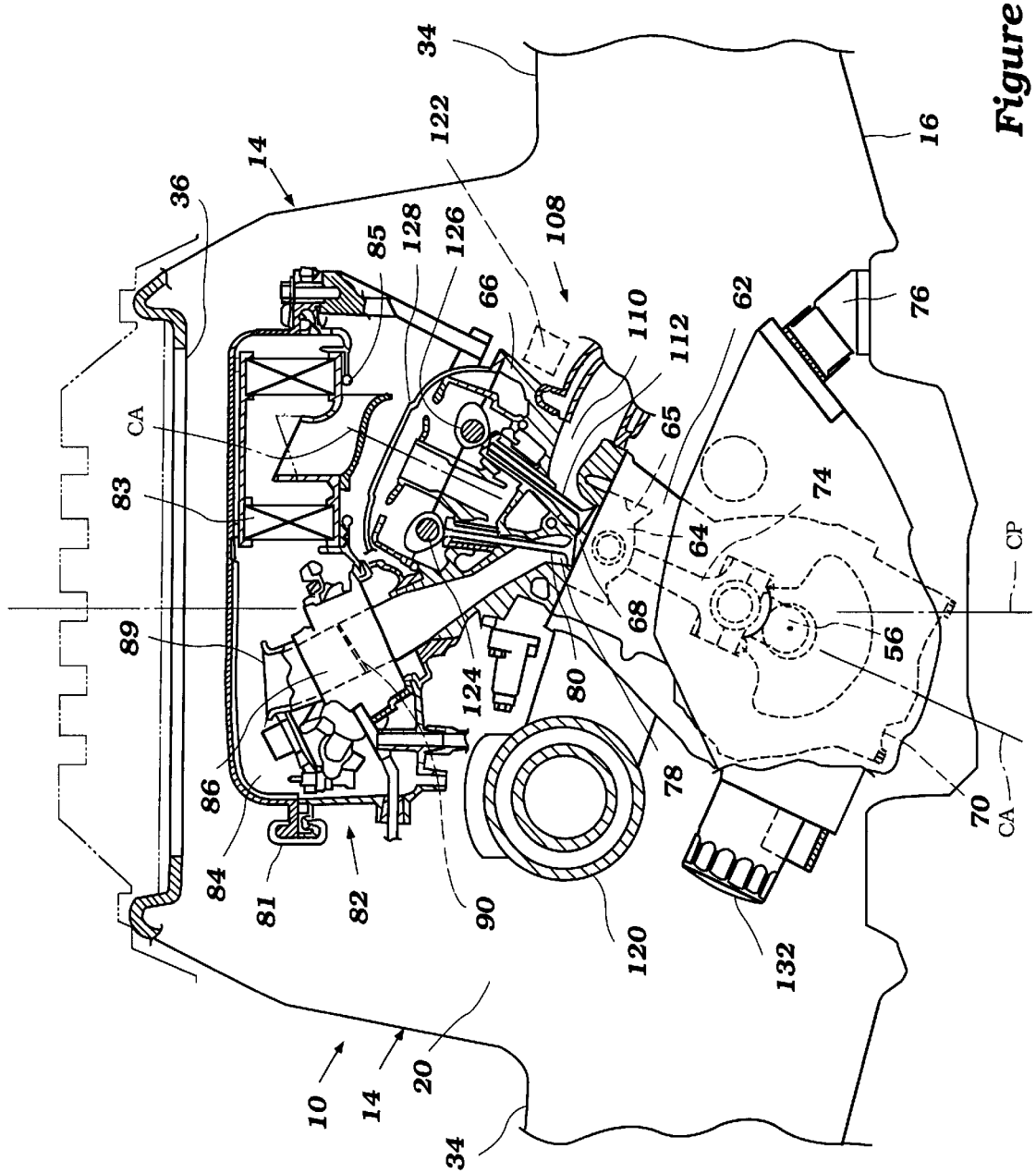
FIG. 5 is a schematic, cross-sectional rear view of the watercraft and the engine. A profile of a hull of the watercraft is shown schematically. Portions of the engine and an opening of an engine compartment of the hull are illustrated partially in section.

With reference to FIGS. 2 and 5, an imaginary center plane CP extends generally vertically from bow to stern through the watercraft 10. Along the center plane CP, the illustrated upper hull section 14 preferably comprises a hatch cover 24, a control mast 26 and a seat 28, which are arranged generally in seriatim from fore to aft.

In the illustrated arrangement, a forward portion of the upper hull section 18 defines a bow portion 30 that slopes upwardly. An opening can be provided through the bow portion 30 so the rider can access the internal cavity 20. The hatch cover 24 can be detachably affixed (e.g., hinged) to the bow portion 30 to resealably cover the opening.

The control mast 26 extends upwardly to support a handle bar 32. The handle bar 32 is provided primarily for controlling the direction of the watercraft 10. The handle bar 32 preferably carries other mechanisms, such as, for example, a throttle lever 35 that is used to control the engine output (i.e., to vary the engine speed).

The seat 28 extends rearwardly along the center plane CP from a portion just rearward of the bow portion 30. In some configurations, the seat 28 is disposed atop a pedestal 29 (see FIG. 1). In the illustrated arrangement, the seat 28 has a saddle shape. Hence, a rider can sit on the seat 28 in a straddle fashion and the illustrated seat 28 often is referred to as a straddle-type seat.

Foot areas 34 are defined on both sides of the seat 28 along a portion of the top surface of the upper hull section 18. The foot areas 34 are formed generally flat but may be inclined toward a suitable drain configuration.

The seat 28 can be formed atop a cover member (not shown) that closes an access opening 36 formed within the pedestal 29. The access opening 36 generally provides suitable access to the internal cavity 20 and, in the illustrated arrangement, to the engine 12. In the illustrated embodiment, the upper hull section 18 or pedestal 29 also encloses a storage box 38 that is disposed under the seat 28.

A fuel tank 40 is positioned in the cavity 20 under the bow portion 30 of the upper hull section 18 in the illustrated arrangement. A duct (not shown) preferably couples the fuel tank 40 with a fuel inlet port positioned at a top surface of the bow 30 of the upper hull section 18. A closure cap 42 (see FIG. 2) closes the fuel inlet port to inhibit water infiltration.

The engine 12 is disposed in an engine compartment defined, for instance within the cavity 20. The engine compartment preferably is located under the seat 28, but other locations are also possible (e.g., beneath the control mast or in the bow). The rider thus can access the engine 12 in the illustrated arrangement through the access opening 36 by detaching the seat 28. In general, the engine compartment is defined within the cavity 20 by a forward and rearward bulkhead. Other configurations, however, are possible.

A pair of air ducts 44 are provided in the illustrated arrangement such that the air within the internal cavity 20 can be readily replenished or exchanged. The engine compartment, however, is substantially sealed to protect the engine 12 and other internal components from water.

A jet pump unit 46 propels the illustrated watercraft 10. Other types of marine drives can be used depending upon the application. The jet pump unit 46 preferably is disposed within a tunnel 48 formed on the underside of the lower hull section 16. The tunnel 48 has a downward facing inlet port 50 opening toward the body of water. A jet pump housing 52 is disposed within a portion of the tunnel 48. Preferably, an impeller (not shown) is supported within the housing 52.

An impeller shaft 54 extends forwardly from the impeller and is coupled with a crankshaft 56 of the engine 12 by a suitable coupling member 58. The crankshaft 56 of the engine 12 thus drives the impeller shaft 54. The rear end of the housing 52 defines a discharge nozzle 57. A steering nozzle 60 is affixed proximate the discharge nozzle 57. The nozzle can be pivotally moved about a generally vertical steering axis. The steering nozzle 60 is connected to the handle bar 32 by a cable or other suitable arrangement so that the rider can pivot the nozzle 60 for steering the watercraft.

The engine 12 in the illustrated arrangement operates on a four-stroke cycle combustion principal. With reference to FIG. 5, the engine 12 includes a cylinder block 62 with four cylinder bores 65 formed side by side along a single plane CA. This plane CA, however, preferably is inclined relative to the generally vertical center plane CP to lower the vertical profile of the engine. The engine 12, thus, is an inclined L4 (in-line four cylinder) type. The illustrated engine, however, merely exemplifies one type of engine on which various aspects and features of the present invention can be used. Engines having a different number of cylinders, other cylinder arrangements, other cylinder orientations (e.g., upright cylinder banks, V-type, and W-type), and operating on other combustion principles (e.g., crankcase compression two-stroke, diesel, and rotary) are all practicable.

With continued reference to FIG. 5, a piston 64 reciprocates in each of the cylinder bores 65 formed within the cylinder block 62. A cylinder head member 66 is affixed to the upper end of the cylinder block 62 to close respective upper ends of the cylinder bores 65. The cylinder head member 66, the cylinder bores 65 and the pistons 64 together define combustion chambers 68.

A lower cylinder block member or crankcase member 70 is affixed to the lower end of the cylinder block 62 to close the respective lower ends of the cylinder bores 65 and to define, in part, a crankshaft chamber. The crankshaft 56 is journaled between the cylinder block 62 and the lower cylinder block member 70. The crankshaft 56 is rotatably connected to the pistons 64 through connecting rods 74. Preferably, a crankshaft speed sensor 105 is disposed proximate the crankshaft to output a signal indicative of engine speed. In some configurations, the crankshaft speed sensor 105 is formed, at least in part, with a flywheel magneto. The speed sensor 105 also can output crankshaft position signals in some arrangements.

The cylinder block 62, the cylinder head member 66 and the crankcase member 70 together generally define the engine 12. The engine 12 preferably is made of an aluminum based alloy. In the illustrated embodiment, the engine 12 is oriented in the engine compartment to position the crankshaft 56 generally parallel to the central plane CP. Other orientations of the engine, of course, are also possible (e.g., with a transversely or vertically oriented crankshaft).

Engine mounts 76 preferably extend from both sides of the engine 12. The engine mounts 76 can include resilient portions made of, for example, a rubber material. The engine 12 preferably is mounted on the lower hull section 16, specifically, a hull liner, by the engine mounts 76 so that the engine 12 is greatly inhibited from conducting vibration energy to the hull section 16.

The engine 12 preferably includes an air induction system to introduce air to the combustion chambers 68. In the illustrated embodiment, the air induction system includes four air intake ports 78 defined within the cylinder head member 66, which ports 78 generally correspond to and communicate with the four combustion chambers 68. Other numbers of ports can be used depending upon the application. Intake valves 80 are provided to open and close the intake ports 78 such that flow through the ports 78 can be controlled. A camshaft arrangement that can be used to control the intake valves 80 is discussed below.

The air induction system also includes an air intake box 82 for smoothing intake airflow and acting as an intake silencer. The intake box 82 in the illustrated embodiment is generally rectangular and, along with an intake box cover 87, defines a plenum chamber 84. The intake box cover 87 can be attached to the intake box 82 with a number of intake box cover clips 81 or any other suitable fastener. Other shapes of the intake box of course are possible, but the plenum chamber preferably is as large as possible while still allowing for positioning within the space provided in the engine compartment.

Figure 6:
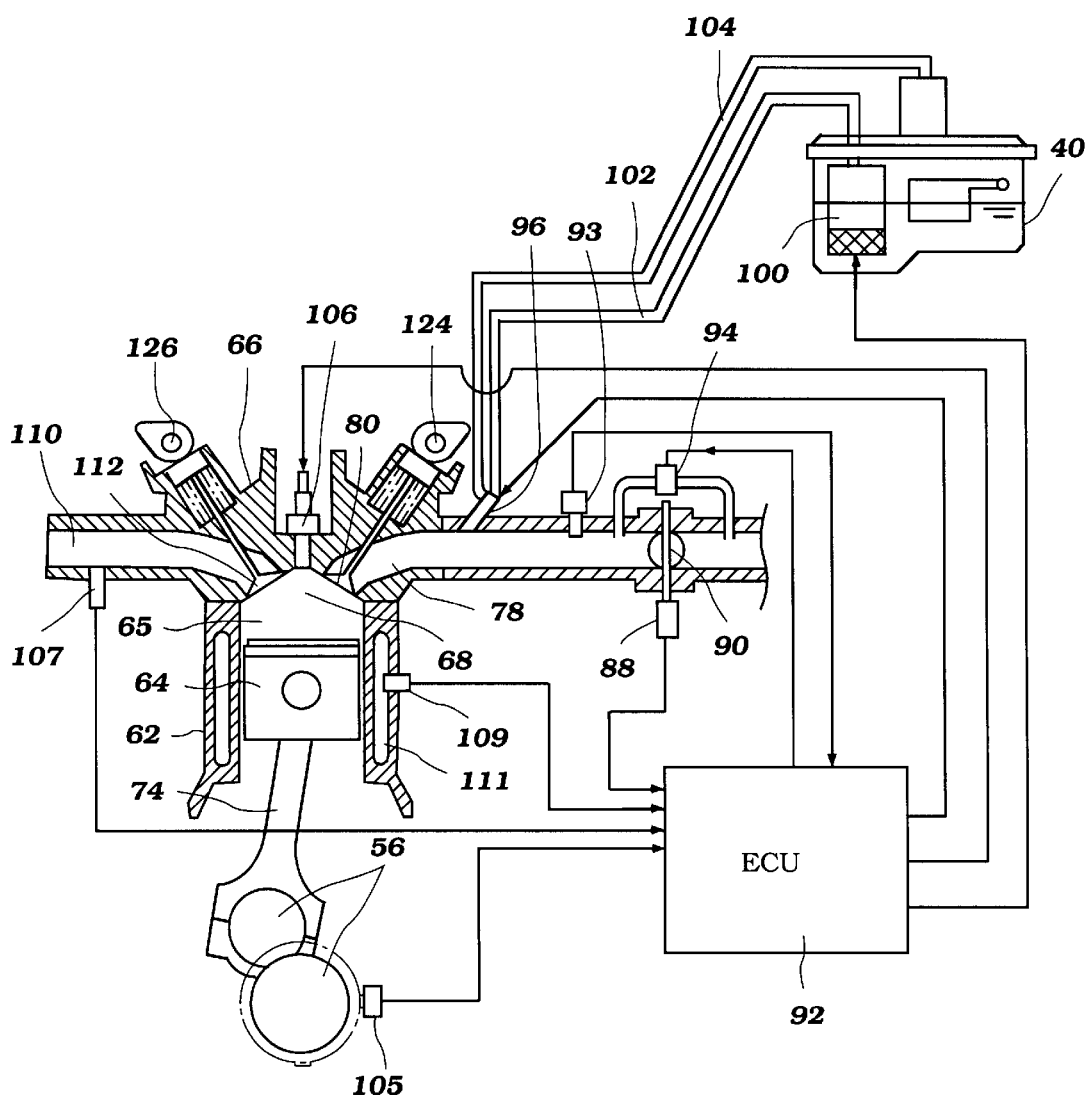
FIG. 6 is a schematic view showing the engine control system, including at least a portion of the engine in cross-section, an ECU, and a simplified fuel injection system.

With reference now to FIG. 5, in the illustrated arrangement, air is introduced into the plenum chamber 84 through a pair of air inlet ports 85 and a filter 83. With reference to FIG. 6, the illustrated air induction system preferably also includes a bypass passage or an idle speed control device (ISC) 94 that can be controlled by an Electronic Control Unit (ECU) 92. In one advantageous arrangement, the ECU 92 is a microcomputer that includes a microcontroller having a CPU, a timer, RAM, and ROM. Of course, other suitable configurations of the ECU also can be used. Preferably, the ECU 92 is configured with or capable of accessing various maps to control engine operation in a suitable manner.

In general, the ISC device comprises an air passage the bypasses the throttle valve 90. Air flow through the air passage of the ISC device preferably is controlled with a suitable valve, such as a needle valve or the like. In this manner, the air flow amount can be controlled in accordance with a suitable control routine, one of which will be discussed below.

With continued reference to FIG. 5, in the illustrated arrangement, the throttle bodies 86 slant toward the port side relative to the center axis CA of the engine 12. Respective top ends 89 of the throttle bodies 86, in turn, open upwardly within the plenum chamber 84. Air in the plenum chamber 84 thus is drawn through the throttle bodies 86 and the intake ports 78 into the combustion chambers 68 when negative pressure is generated in the combustion chambers 68. The negative pressure is generated when the pistons 64 move toward the bottom dead center position from the top dead center position during the intake stroke.

With reference again to FIG. 6, a throttle valve position sensor 88 preferably is arranged proximate a throttle valve shaft assembly 90 in the illustrated arrangement. The sensor 88 preferably generates a signal that is representative of either absolute throttle position or movement of the throttle shaft. In any event, the signal from the throttle valve position sensor 88 preferably corresponds generally to the engine load, as may be indicated by the degree of throttle opening. In some applications, a manifold pressure sensor 93 can be provided to detect engine load. The signal from the throttle position sensor 88 (and/or manifold pressure sensor 93) can be sent to the ECU 92 via a throttle position data line. The signal can be used to control various aspects of engine operation, such as, for example, but without limitation, fuel injection amount, fuel injection timing, ignition timing, ISC valve positioning and the like.

The engine 12 also includes a fuel injection system which preferably includes four fuel injectors 96, each having an injection nozzle exposed to the intake ports 78 so that injected fuel is directed toward the combustion chambers 68. Thus, in the illustrated arrangement, the engine 12 features port fuel injection. It is anticipated that various features, aspects and advantages of the present invention also can be used with direct or other types of indirect fuel injection systems.

With reference again to FIG. 6, fuel is drawn from the fuel tank 40 by a fuel pump 100, which is controlled by the ECU 92. The fuel is delivered to the fuel injectors 96 through a fuel delivery conduit 102. A fuel return conduit 104 also is provided between the fuel injectors and the fuel tank 40. Excess fuel that is not injected by the fuel injector 96 returns to the fuel tank 40 through the conduit 104. The flow generated by the return of the unused fuel from the fuel injectors aids in cooling the fuel injectors.

In operation, a predetermined amount of fuel is sprayed into the intake ports 78 via the injection nozzles of the fuel injectors 96. The timing and duration of the fuel injection is dictated by the ECU 92 based upon any desired control strategy. In one presently preferred configuration, the amount of fuel injected is determined based, at least in part, upon the sensed throttle valve position. The fuel charge delivered by the fuel injectors 96 then enters the combustion chambers 68 with an air charge when the intake valves 80 open the intake ports 78.

The engine 12 further includes an ignition system. In the illustrated arrangement, four spark plugs 106 are fixed on the cylinder head member 66. The electrodes of the spark plugs 106 are exposed within the respective combustion chambers 68. The spark plugs 106 ignite an air/fuel charge just prior to, or during, each power stroke, preferably under the control of the ECU 92 to ignite the air/fuel charge therein.

The engine 12 further includes an exhaust system 108 to discharge burnt charges, i.e., exhaust gases, from the combustion chambers 68. In the illustrated arrangement, the exhaust system 108 includes four exhaust ports 110 that generally correspond to, and communicate with, the combustion chambers 68. The exhaust ports 110 preferably are defined in the cylinder head member 66. Exhaust valves 112 preferably are provided to selectively open and close the exhaust ports 110. A suitable exhaust cam arrangement, such as that described below, can be provided to operate the exhaust valves 112.

A combustion condition or oxygen sensor 107 preferably is provided to detect the in-cylinder combustion conditions by sensing the residual amount of oxygen in the combustion products at a point in time very close to when the exhaust port is opened. The signal from the oxygen sensor 107 preferably is delivered to the ECU 92. The oxygen sensor 107 can be disposed within the exhaust system at any suitable location. In the illustrated arrangement, the oxygen sensor 107 is disposed proximate the exhaust port 110 of a single cylinder. Of course, in some arrangements, the oxygen sensor can be positioned in a location further downstream; however, it is believed that more accurate readings result from positioning the oxygen sensor upstream of a merge location that combines the flow of several cylinders.

Figure 3:
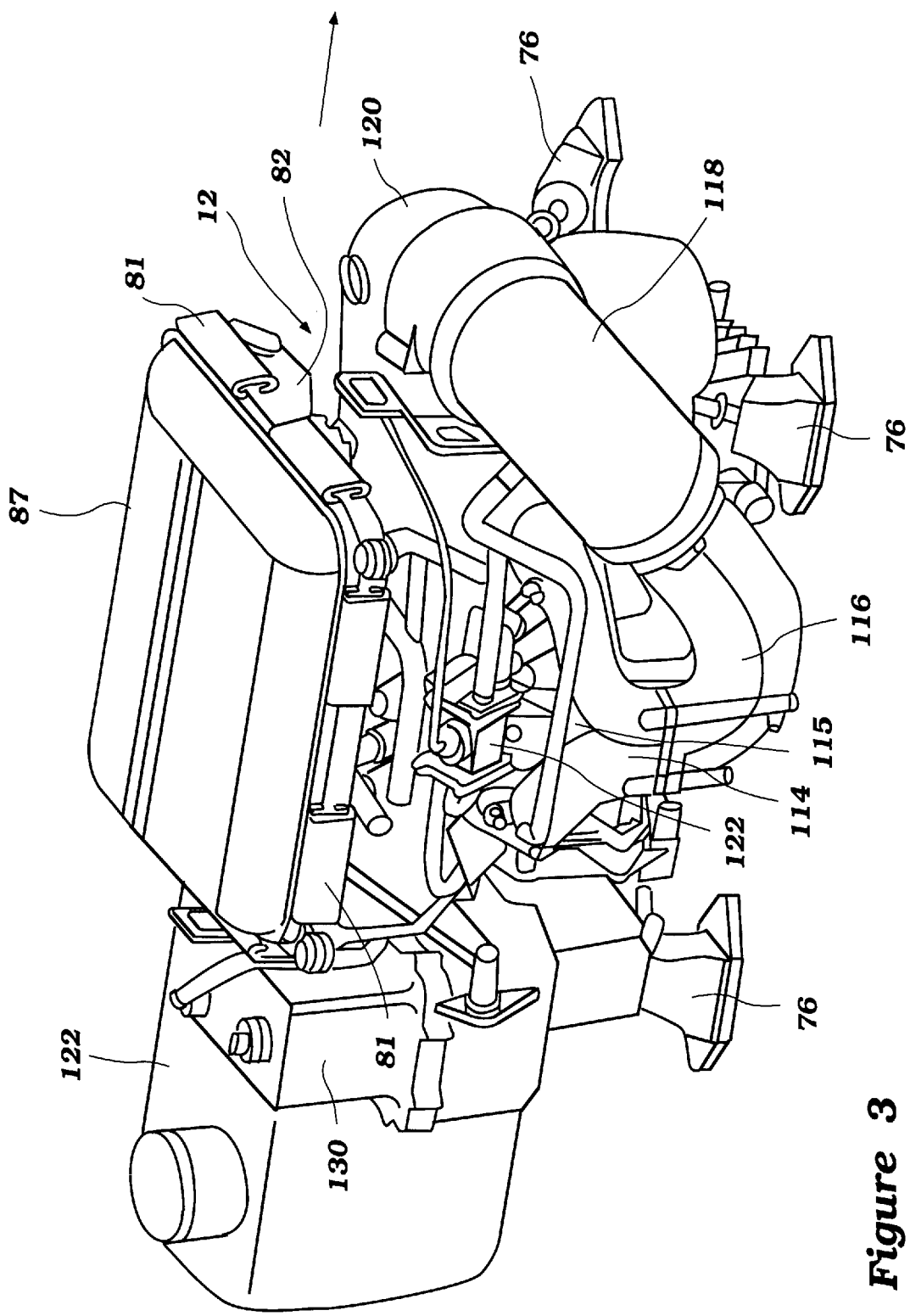
FIG. 3 is a perspective view of the engine viewed from a slightly forward location on the port

With reference now to FIG. 3, the illustrated exhaust system 108 preferably includes two small exhaust manifolds 114, 115 that each receive exhaust gases from a pair of exhaust ports 110 (i.e., a pair of cylinders). The respective downstream ends of the exhaust manifolds 114, 115 are coupled with a first unitary exhaust conduit 116. The first unitary conduit 116 is further coupled with a second unitary exhaust conduit 118. The second unitary conduit 118 is coupled with an exhaust pipe 120 at a location generally forward of the engine 12.

The exhaust pipe 120 extends rearwardly along a port side surface of the engine 12. The exhaust pipe 120 is connected to a water-lock 122 proximate a forward surface of the water-lock 122. With reference to FIG. 2, a discharge pipe 124 extends from a top surface of the water-lock 122. The discharge pipe 124 bends transversely across the center plane CP and rearwardly toward a stem of the watercraft. Preferably, the discharge pipe 124 opens at a stem of the lower hull section 16 in a submerged position. As is known, the water-lock 122 generally inhibits water in the discharge pipe 124 or the water-lock itself from entering the exhaust pipe 120.

The engine 12 further includes a cooling system configured to circulate coolant into thermal communication with at least one component within the watercraft 10. Preferably, the cooling system is an open-loop type of cooling system that circulates water drawn from the body of water in which the watercraft 10 is operating through thermal communication with heat generating components of the watercraft 10 and the engine 12. It is expect that other types of cooling systems can be used in some applications. For instance, in some applications, a closed-loop type liquid cooling system can be used to cool lubricant and other components.

The present cooling system preferably includes a water pump arranged to introduce water from the body of water surrounding the watercraft 10. The jet propulsion unit preferably is used as the water pump with a portion of the water pressurized by the impeller being drawn off for use in the cooling system, as is generally known in the art. Preferably, water jackets 111 can be provided around portions of the cylinder block 62 and the cylinder head member 66 (see FIG. 6).

In some applications, the exhaust system 108 is comprised of a number of double-walled components such that coolant can flow between the two walls (i.e., the inner and outer wall) while the exhaust gases flow within a lumen defined by the inner wall. Such constructions are well known.

An engine coolant temperature sensor 109 preferably is positioned to sense the temperature of the coolant circulating through the engine. Of course, the sensor 109 could be used to detect the temperature in other regions of the cooling system; however, by sensing the temperature proximate the cylinders of the engine, the temperature of the combustion chamber and the closely positioned portions of the induction system is more accurately reflected.

With reference again to FIG. 3, the engine 12 preferably includes a secondary air supply system that supplies air from the air induction system to the exhaust system 108. More specifically, for example, hydrocarbon (HC) and carbon monoxide (CO) components of the exhaust gases can be removed by an oxidation reaction with oxygen ($O_2$) that is supplied to the exhaust system 108 from the air induction system. In one arrangement of the secondary air supply system, a secondary air supply device 122 is disposed next to the cylinder head member 66 on the starboard side. The air supply device 122 defines a generally closed cavity and contains a control valve in the illustrated arrangement. Air supplied from the air supply device 122 passes directly to the exhaust system 108 when the engine 12 is operating in a relatively high speed range and/or under a relatively high load condition because greater amounts of hydrocarbon (HC) and carbon monoxide (CO) are more likely to be present in the exhaust gases under such a condition.

With reference to FIGS. 5 and 6, the engine 12 preferably has a valve cam mechanism for actuating the intake and exhaust valves 80, 112. In the illustrated embodiment, a double overhead camshaft drive is employed. That is, an intake camshaft 124 actuates the intake valves 80 and an exhaust camshaft 126 separately actuates the exhaust valves 112. The intake camshaft 124 extends generally horizontally over the intake valves 80 from fore to aft generally in parallel to the center plane CP, and the exhaust camshaft 126 extends generally horizontally over the exhaust valves 112 from fore to aft also generally in parallel to the center plane CP.

Both the intake and exhaust camshafts 124, 126 are journaled in the cylinder head member 66 in any suitable manner. A cylinder head cover member 128 extends over the camshafts 124, 126, and is affixed to the cylinder head member 66 to define a camshaft chamber. The secondary air supply device 122 is preferably affixed to the cylinder head cover member 128. Additionally, the air supply device 122 is desirably disposed between the intake air box and the engine 12.

The intake camshaft 124 has cam lobes each associated with the respective intake valves 80, and the exhaust camshaft 126 also has cam lobes associated with respective exhaust valves 112. The intake and exhaust valves 80, 112 normally close the intake and exhaust ports 78, 110 by a biasing force of springs. When the intake and exhaust camshafts 124, 126 rotate, the cam lobes push the respective valves 80, 112 to open the respective ports 78, 110 by overcoming the biasing force of the spring. Air enters the combustion chambers 68 when the intake valves 80 open. In the same manner, the exhaust gases exit from the combustion chambers 68 when the exhaust valves 112 open.

The crankshaft 56 preferably drives the intake and exhaust camshafts 124, 126. The respective camshafts 124, 126 have driven sprockets affixed to ends thereof while the crankshaft 56 has a drive sprocket. Each driven sprocket has a diameter that is twice as large as a diameter of the drive sprocket. A timing chain or belt is wound around the drive and driven sprockets. When the crankshaft 56 rotates, the drive sprocket drives the driven sprockets via the timing chain, and thus the intake and exhaust camshafts 124, 126 also rotate.

Figure 4:
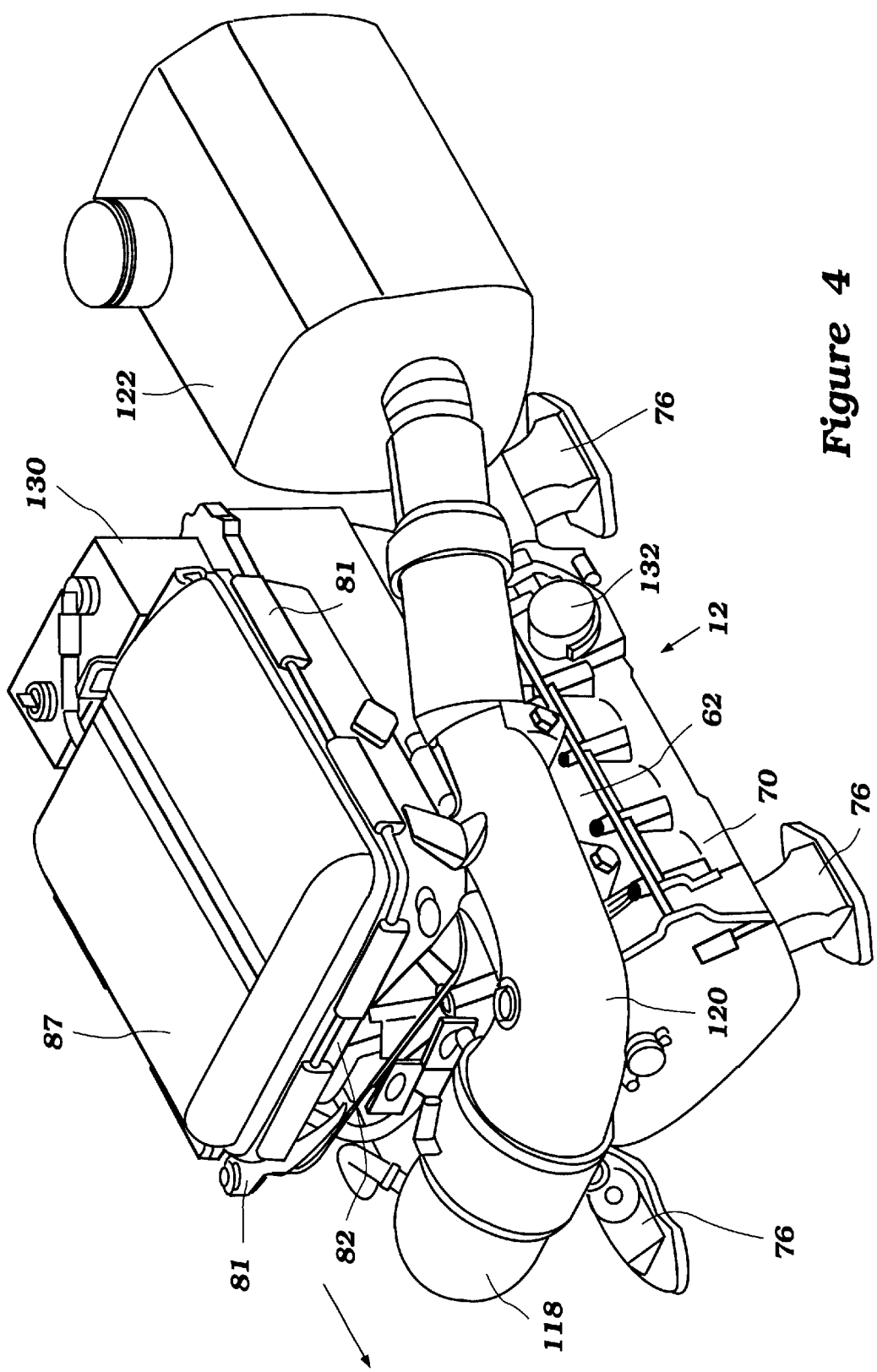
FIG. 4 is a perspective view of the engine viewed from a slightly forward location on the port side.

The engine 12 preferably includes a lubrication system that delivers lubricant oil to engine portions for inhibiting frictional wear of such portions. In the illustrated embodiment, a dry-sump lubrication system is employed. This system is a closed-loop type and includes an oil reservoir 130, as illustrated in FIGS. 3 and 4.

An oil delivery pump is provided within a circulation loop to deliver the oil in the reservoir 130 through an oil filter 132 to the engine portions that are to be lubricated, for example, but without limitation, the pistons 64 and the crankshaft bearings (not shown). The crankshaft 56 or one of the camshafts 124,126 preferably drives the delivery pump. The crankshaft 56 or one of the camshafts 124, 126 preferably drives the return pump also.

In order to determine appropriate engine operation control scenarios, the ECU 92 preferably uses these control maps and/or indices stored within the ECU 92 in combination with data collected from various input sensors. The ECU's various input sensors can include, but are not limited to, the throttle position sensor 90, the manifold pressure sensor 93, the engine coolant temperature sensor 109, the oxygen ($O_2$) sensor 67 and a crankshaft speed sensor 105. It should be noted that the above-identified sensors merely correspond to some of the sensors that can be used for engine control and it is, of course, practicable to provide other sensors, such as an intake air pressure sensor, an intake air temperature sensor, a knock sensor, a neutral sensor, a watercraft pitch sensor, a shift position sensor and an atmospheric temperature sensor. The selected sensors can be provided for sensing engine running conditions, ambient conditions or other conditions of the engine 12 or associated watercraft 10.

During engine operation, ambient air enters the internal cavity 20 defined in the hull 14 through the air ducts 44. The air is then introduced into the plenum chamber 84 defined by the intake box 82 through the air inlet ports 85 and drawn into the throttle bodies 86. The air filter element 83, which preferably comprises a water-repellent element and an oil resistant element, filters the air. The majority of the air in the plenum chamber 84 is supplied to the combustion chambers 68. The throttle valves 90 in the throttle bodies 148 regulate an amount of the air permitted to pass to the combustion chambers 68. The opening angles of the throttle valves 90, and thus, the airflow across the throttle valves 90, can be controlled by the rider with the throttle lever 34. The air flows into the combustion chambers 68 when the intake valves 80 open. At the same time, the fuel injectors 96 spray fuel into the intake ports 78 under the control of ECU. Air/fuel charges are thus formed and delivered to the combustion chambers 68.

The air/fuel charges are fired by the spark plugs 106 under the control of the ECU. The burnt charges, i.e., exhaust gases, are discharged to the body of water surrounding the watercraft 10 through the exhaust system 108. A relatively small amount of the air in the plenum chamber 84 is supplied to the exhaust system 108 so as to aid in further combustion of any unburned fuel remaining in the exhaust gases.

The combustion of the air/fuel charges causes the pistons 64 to reciprocate and thus causes the crankshaft 56 to rotate. The crankshaft 56 drives the impeller shaft 54 and the impeller rotates in the hull tunnel 48. Water is thus drawn into the tunnel 48 through the inlet port 50 and then is discharged rearward through the steering nozzle 60. The rider steers the nozzle 60 by the steering handle bar 32. The watercraft 10 thus moves as the rider desires.

Figure 7:
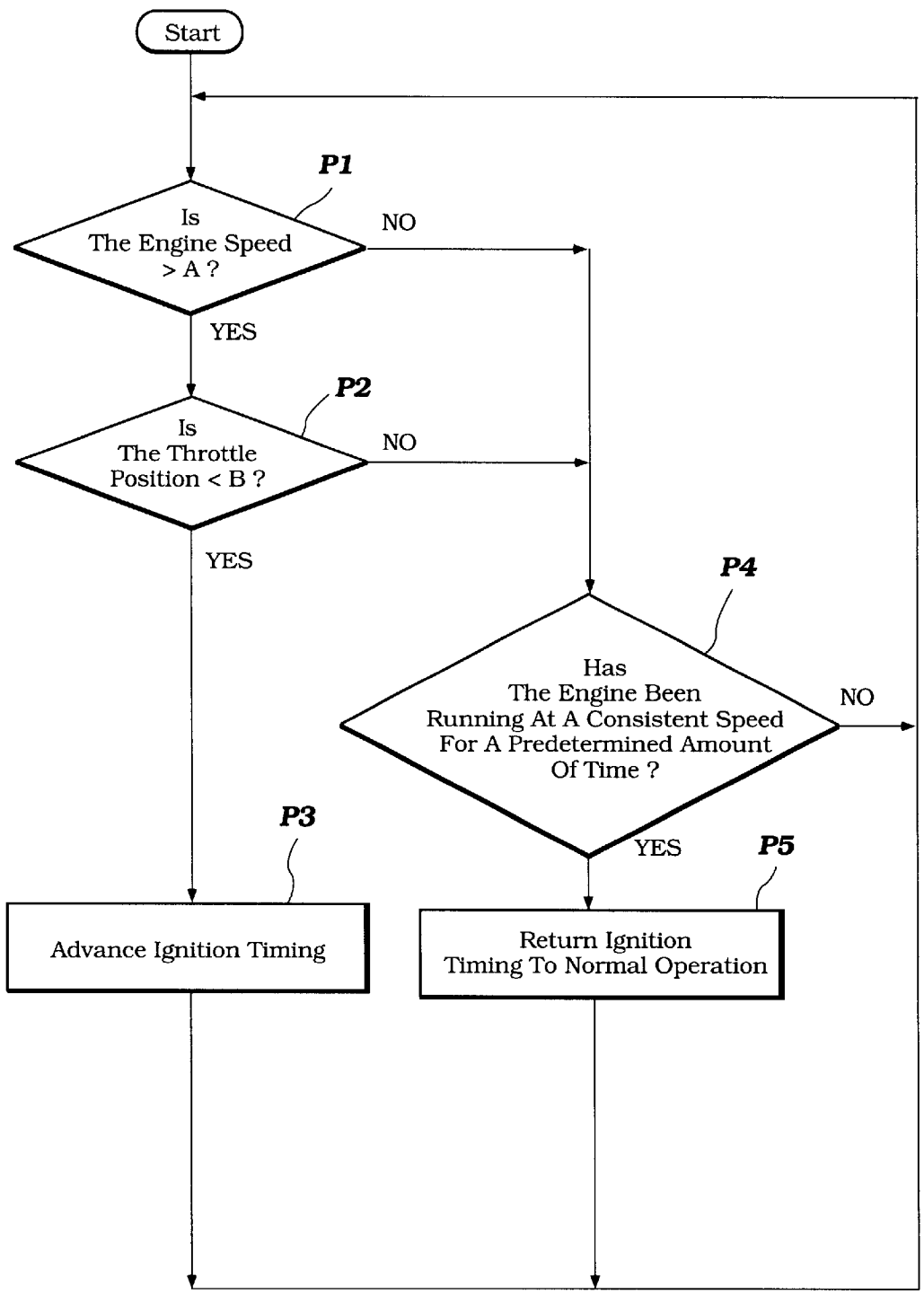
FIG. 7 is a block diagram showing a control routine arranged and configured in accordance with certain features, aspects and advantages of the present invention.

With reference now to FIG. 7, a control arrangement is shown that is arranged and configured in accordance with certain features, aspects and advantages of the present invention. The control routine begins and moves to a first decision block P1 in which the engine speed is compared to a predetermined engine planing speed "A" (e.g., A can be about 6000 RPM in some applications). Preferably, the predetermined engine planing speed is an engine speed that generally corresponds to a watercraft speed that places the watercraft in the planing mode.

If the speed is greater than "A", the routine proceeds to a decision block P2 in which the throttle position is checked to determine if the throttle position reflects a position or rate of change associated with rapid throttle closure. In the illustrated arrangement, a generally closed throttle position while the watercraft engine is operating at a high engine speed would indicate that the throttle valve has been rapidly closed. Hence, in the illustrated arrangement of FIG. 7, the sensed throttle angle is compared to a predetermined throttle angle "B", which can be about 5 degrees in some arrangements.

If the sensed throttle angle is less than "B", then the routine proceeds to an operation block P3 where the ignition timing is advanced to a predetermined value. After the ignition timing is advanced, the routine repeats. Preferably, the routine repeats substantially continuously during engine operation.

Returning to the decision block P1 and the decision block P2, if the engine speed is determined to be less than "A" or if the throttle position is greater than "B", then the routine proceeds to a decision block P4 where the stabilization of engine operation is checked. In one configuration, the routine checks whether a preset period of time, which can be determined empirically, has passed. After the predetermined period of time has passed, then the engine operation would be sufficiently stabilized to stop advancing the ignition timing because the fuel injector control system would adequately reflect the engine speed and the air fuel mixture would not be overly rich to the point of causing engine stall. Of course, in some applications, such as that reflected in FIG. 9, the period of time can be a period of time in which the engine speed has substantially stabilized (i.e., an absence of wide changes in engine speed) at a speed lower than the speed associated with the planing mode of the watercraft. Thus, after the engine has operated for a predetermined period of time at a substantially constant speed that is lower than the speed associated with beginning the planing mode, then the routine continues to an operation block P5. In the operation block P5, the ignition timing is retarded to normal operation (i.e., the temporary advance in ignition timing is removed). The routine then repeats.

As illustrated, if, in the decision block P4, the engine has not had enough time to stabilize, then the routine repeats without adjusting the ignition timing.

Figure 8:
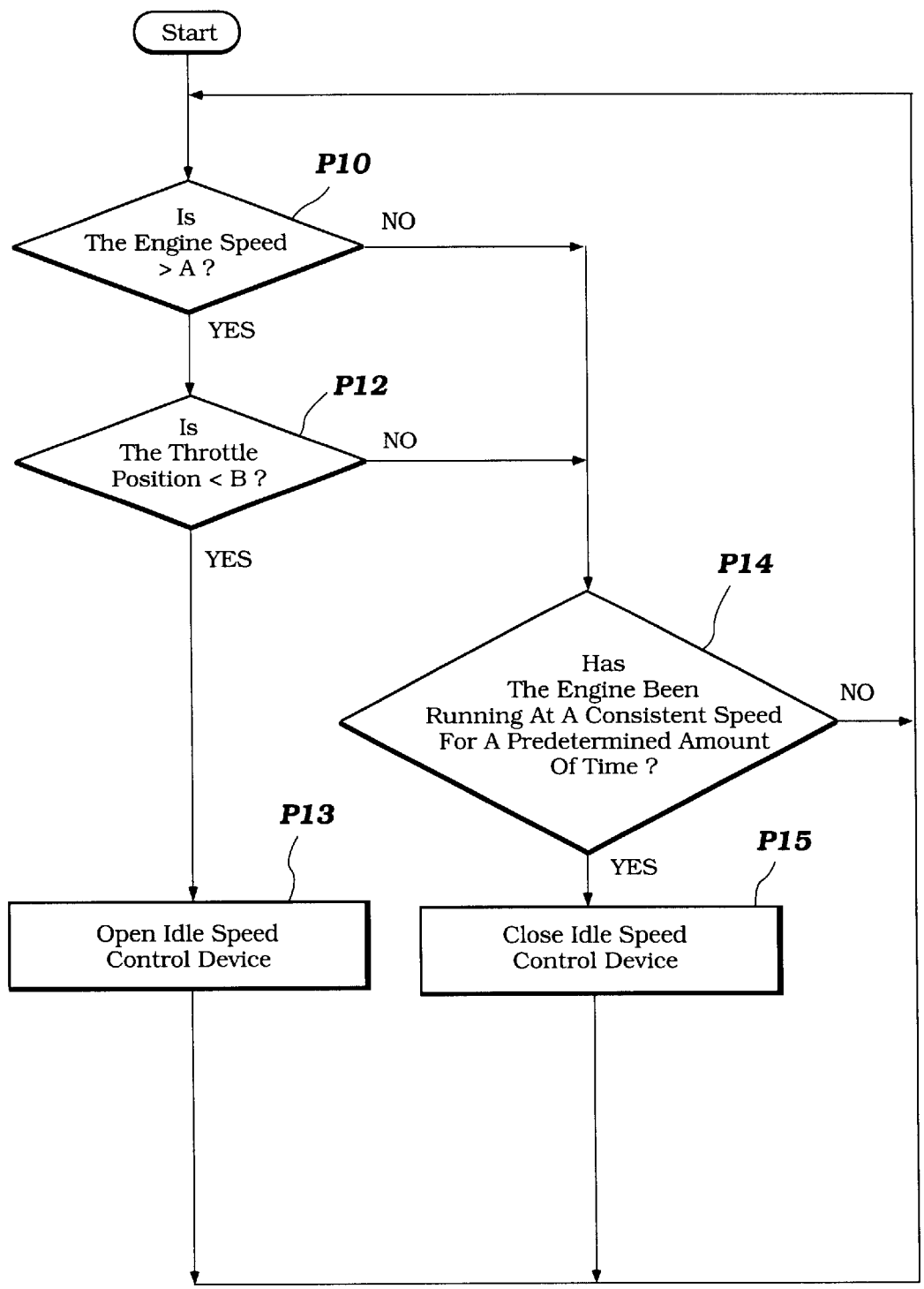
FIG. 8 is a block diagram showing another control routine arranged and configured in accordance with certain features, aspects and advantages of the present invention.
Figure 9A:
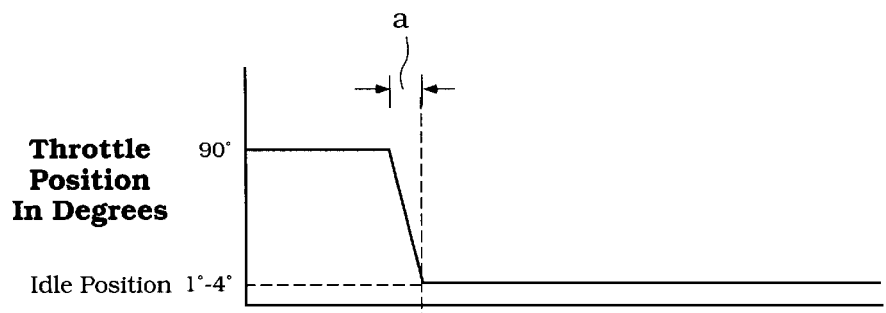
FIG. 9a is a diagram illustrating a throttle valve position over time.
Figure 9B:
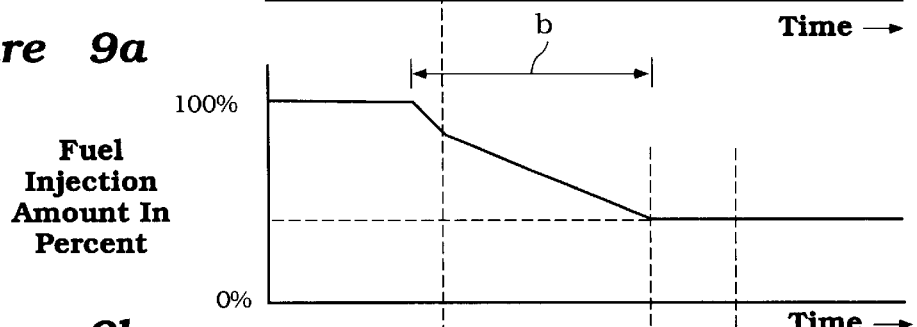
Figure 9C:
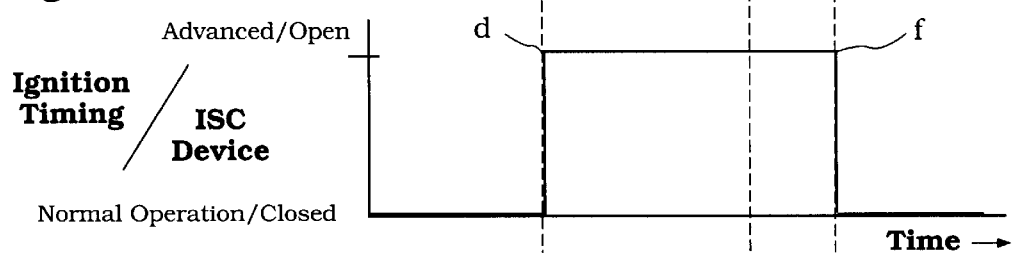
FIG. 9c is a diagram illustrating ignition timing or ISC device position over time.
Figure 9D:
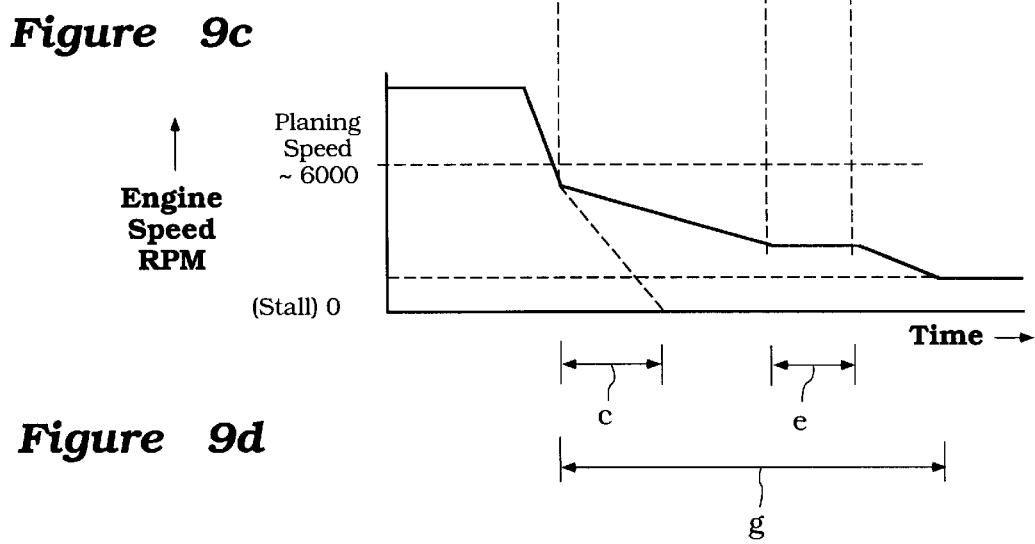
FIG. 9d is a diagram illustrating the speed of the engine in revolutions per minute (RPM) when the engine is operated in the manner shown in FIGS. 9a through 9c.

With reference now to FIG. 8, another control routine that is arranged and configured in accordance with certain features, aspects and advantages of the present invention is illustrated. After starting, this routine proceeds to decision block PIO where the sensed engine speed is compared to a predetermined engine speed "A" (e.g., "A" can be 6000 RPM in some applications). If the sensed engine speed is greater than "A", the routine proceeds to a decision block P12, where the sensed throttle position is compared to a predetermined angle "B", which may be about 5 degrees in some applications. As discussed above, the predetermined angle in combination with the predetermined engine speed are used to determine whether a rapid throttle valve closure has occurred. In some applications, the rate of throttle valve movement can be monitored. In such applications, engine speed or watercraft speed can be used to determine whether the rapid closure of the throttle valve may pose concerns over engine stall (e.g., the watercraft or engine speed reflects a planing mode).

In the decision block P12, if the throttle angle is less than "B", then the routine continues to the operation block P13 where the airflow regulating valve of the ISC device is opened to increase the flow of air to the combustion chamber. The routine then repeats as long as the engine is operating.

Returning again to the decision block P10 and the decision block P12, if either the sensed engine speed is less than "A", or the sensed throttle position is less than "B", then the routine proceeds to a decision block P14 in which stabilization of engine speed is checked in the manner set forth above in the discussion of the control routine shown in FIG. 7. If the engine speed has stabilized, then the routine continues to an operation block P15 where the valve of the idle speed control device is closed. If, however, the engine speed has not stabilized, then the routine repeats again.

With reference now to FIG. 9, the effect on engine operation of both the routine illustrated in FIG. 7 and the routine illustrated in FIG. 8 are graphically depicted. As illustrated, the throttle position change illustrated in FIG. 9a shows an example of a rapidly closed throttle valve (i.e., the time "a" in which the throttle valve closes is very short). As a result of the closure of the throttle valve, the engine begins to rapidly decrease from a speed above the planing mode engine speed, which is shown with a dashed line in FIG. 9d. Once the sensed engine speed is below the planing mode engine speed (e.g., 6000 rpm) and the sensed throttle valve position is in a position substantially corresponding to idle speed operation (e.g., angle less than 5 degrees), the controller takes corrective action. In one arrangement, the corrective action comprises adjusting the ignition timing while, in another arrangement, the corrective action comprises increasing the air flow through an idle speed control passage. Of course, in some configurations, both actions can be taken simultaneously or in seriatim. The corrective action (the timing of which is indicated by the letters d and f in FIG. 9) decreases the rate of engine deceleration which allows the fuel injection control to better reflect the actual engine speed. In fact, the fuel injection amount preferably is incrementally reduced during the engine deceleration over a period of time, such as that indicated by the letter b in FIG. 9. Without taking a corrective action, the engine speed may continue to decrease until the engine stalls due to an overly rich fuel mixture (see period of time indicated by the letter c in FIG. 9 along with the accompanying dashed line). Eventually, a substantially constant but higher than idle engine speed will be attained for a predetermined period of time (i.e., the period of time indicated by the letter e in FIG. 9). After the predetermined period of time has elapsed, the corrective action is ended and the engine speed is allowed to further decrease to the desired idle speed. Thus, the routines of FIGS. 7 and 8 both return the engine to a predetermined idle speed within a desirably short period of time, which is indicated by the letter g in FIG. 9 while substantially reducing the likelihood of engine stall.

Figure 10:
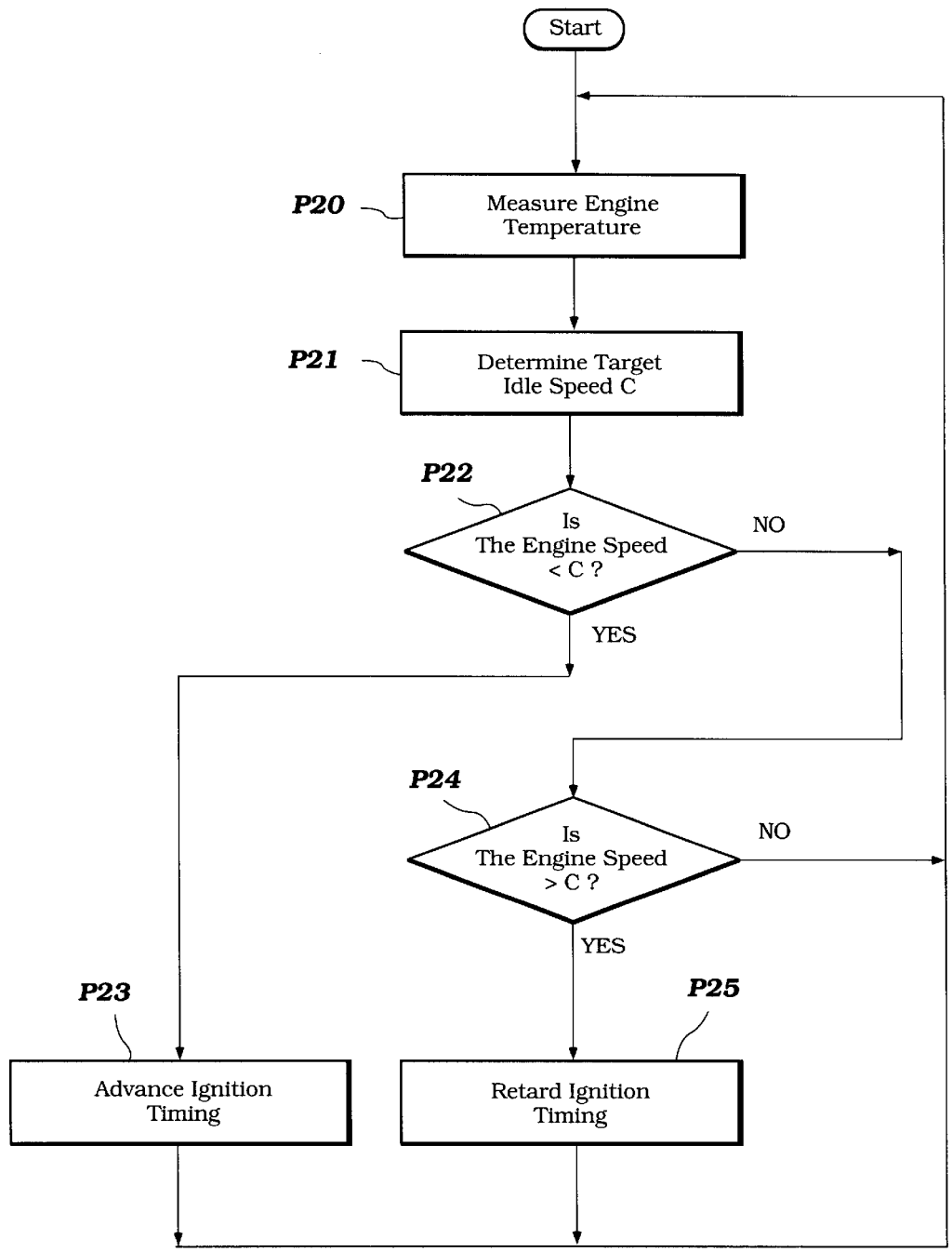
FIG. 10 is a block diagram showing another control routine arranged and configured in accordance with certain features, aspects and advantages of the present invention.

With reference now to FIG. 10, another control routine is disclosed therein. In general, the control routine of FIG. 10 sets a desired engine idle speed depending at least in part on engine temperature and varies the ignition timing to achieve and/or to maintain that engine speed. With reference to FIG. 10, the illustrated routine starts and proceeds to an operation block P20 where the engine temperature is measured. The routine continues to an operation block P21 where an idle speed C is determined and set based upon the sensed engine temperature. The routine then continues to a decision block P22 in which the sensed engine speed is compared to the set idle speed C. If the engine speed is less than the set idle speed C, then the routine moves to an operation block P23 where the ignition timing is advanced in order to raise the engine speed and the routine then repeats.

On the other hand, if the engine speed is not less than the set idle speed C, then the routine continues to a further decision block P24 where the routine determines if the engine speed is greater than the set idle speed C. If the sensed engine speed is greater than the set idle speed C, then the routine proceeds to an operation block P25 where the ignition timing is retarded in order to lower the engine speed and the routine then repeats.

As illustrated, if the sensed engine speed is the same (i.e., within a preset range or identical to) the set idle speed C, then the routine repeats without adjusting the ignition timing.

It is to be noted that the control systems described above may be in the form of a hard wired feedback control circuit in some configurations. Alternatively, the control systems may be constructed of a dedicated processor and memory for storing a computer program configured to perform the steps described above in the context of the flowcharts. Additionally, the control systems may be constructed of a general purpose computer having a general purpose processor and memory for storing the computer program for performing the routines. Preferably, however, the control systems are incorporated into the ECU 110, in any of the above-mentioned forms.

Although the present invention has been described in terms of a certain preferred embodiments, other embodiments apparent to those of ordinary skill in the art also are within the scope of this invention. Thus, various changes and modifications may be made without departing from the spirit and scope of the invention. For instance, various steps within the routines may be combined, separated, or reordered. In addition, some of the indicators sensed (e.g., engine speed and throttle position) to determine certain operating conditions (e.g., rapid deceleration) can be replaced by other indicators of the same or similar operating conditions. Moreover, not all of the features, aspects and advantages are necessarily required to practice the present invention. Accordingly, the scope of the present invention is intended to be defined only by the claims that follow.

What is claimed is:

1. A method of controlling a marine engine associated with a watercraft, said method comprising sensing a rapid deceleration when said watercraft is in a planing mode, altering an engine operating parameter to increase said engine speed when said rapid deceleration occurs when said watercraft is in said planing mode, sensing when an engine speed has attained a stabilized engine speed lower than an engine speed associated with said planing mode and returning said engine operating parameter to normal after the engine speed has attained said stabilized engine speed.

2. The method of claim 1, wherein sensing when said engine speed has attained said stabilized engine speed comprises sensing a substantially constant engine speed for a predetermined period of time.

3. The method of claim 2, wherein said substantially constant engine speed is slightly higher than a desired engine idle speed.

4. The method of claim 1, wherein altering said engine operating parameter comprises advancing an ignition timing.

5. The method of claim 1, wherein altering said engine operating parameter comprises opening an idle speed control device such that air flow into said engine is increased.

6. The method of claim 1, wherein sensing said rapid deceleration when said watercraft is in said planing mode comprises sensing whether said engine speed is higher than an engine speed at which said watercraft can begin said planing mode.

7. The method of claim 6, wherein sensing said rapid deceleration when said watercraft is in said planing mode comprises sensing whether said throttle position is less than a predetermined throttle position, said predetermined throttle position being associated with watercraft operation in a mode other than said planing mode.

8. The method of claim 7, wherein sensing when said engine speed has attained said stabilized engine speed comprises sensing a substantially constant engine speed for a predetermined period of time.

9. The method of claim 8, wherein said substantially constant engine speed is slightly higher than a desired engine idle speed.

10. The method of claim 9, wherein said desired engine idle speed is determined based at least in part upon an engine operating temperature.

11. The method of claim 10, wherein said desired engine idle speed can be maintained by adjusting an ignition timing of said engine.

12. A personal watercraft comprising a hull adapted for at least two modes of operation, one of said at least two modes being a planing mode and another of said at least two modes being a displacement mode, an engine disposed within said hull, said engine comprising a cylinder defined by a cylinder wall, a piston being reciprocally mounted within said cylinder, a combustion chamber being at least partially defined by said piston, said piston being drivingly connected to a crankshaft, a crankshaft sensor being adapted to sense a speed of said crankshaft, an induction system supplying air to said combustion chamber, a throttle valve being disposed within said induction system, an induction sensor being adapted to sense an airflow into said combustion chamber, an ignition system comprising an igniter that is disposed within said combustion chamber to ignite an air-fuel charge within said combustion chamber, and a controller that is in electrical communication with said crankshaft sensor and said induction system, said controller being adapted to adjust an engine operating parameter if said watercraft is in said planing mode and said engine undergoes a rapid decrease in engine speed, said engine operating parameter being adjusted such that a rate of engine speed decrease is slowed.

13. The watercraft of claim 12, wherein said induction system further comprises an idle air bypass assembly that selectively circumvents said throttle valve, said idle air bypass assembly comprising a valve that can adjust an amount of air flow through said idle air bypass assembly.

14. The watercraft of claim 13, wherein said engine operating parameter comprises air flow into said combustion chamber and said controller is adapted to open said valve of said idle air bypass assembly to increase said amount of air flow through said idle air bypass assembly to slow said rate of engine speed decrease.

15. The watercraft of claim 12, wherein said engine operating parameter comprises ignition timing and said controller is adapted to advance said ignition timing to slow said rate of engine speed decrease.

16. The watercraft of claim 12, wherein said planing mode is determined by output from said crankshaft sensor.

17. The watercraft of claim 12, wherein said rapid decrease in engine speed is determined by output from either said induction sensor or said crankshaft sensor.

18. The watercraft of claim 17, wherein said induction sensor comprises a throttle valve position sensor.

19. The watercraft of claim 12, wherein said rapid decrease in engine speed is determined by output from said induction sensor.

20. The watercraft of claim 19, wherein said induction sensor comprises a throttle valve position sensor.

* * * * *